INVENTOR.
RALPH L. JAESCHKE
BY
ATTORNEY

INVENTOR.
RALPH L. JAESCHKE
BY
ATTORNEY

Aug. 23, 1960    R. L. JAESCHKE    2,949,991
FRICTION CLUTCH

Filed Feb. 12, 1957    4 Sheets-Sheet 4

INVENTOR.
RALPH L. JAESCHKE
BY
*Joseph R. Spagno*
ATTORNEY

United States Patent Office 2,949,991
Patented Aug. 23, 1960

2,949,991

FRICTION CLUTCH

Ralph L. Jaeschke, Kenosha, Wis., assignor to Eaton Manufacturing Company, Cleveland, Ohio, a corporation of Ohio Filed Feb. 12, 1957, Ser. No. 639,740

12 Claims. (Cl. 192—107)

This invention relates to an improvement in an electromagnetic friction clutch or brake device wherein a novel clutch plate having a plurality of clutch segment pads attached thereto is selectively moved to an engaged or disengaged position or energizable coil means.

Heretofore, the success of devices of this type has been hammered by excessive heat built up in the clutch faces causing an abnormally short clutch life and erratic and undesirable operation.

It is an object of this invention to provide a clutch or brake device which has a large capacity for the dissipation of heat caused by engagement, thereby limiting distortion of the elements.

Another object of this invention is to provide a clutch or brake device which is highly resistant to coning of the engaging surfaces.

A further object is to provide a device wherein smooth engagement and disengagement is obtained and which has prolonged operating life.

These and other objects and advantages will become more apparent from the following detailed description of this invention and from the accompanying drawings wherein.

Figure 1:
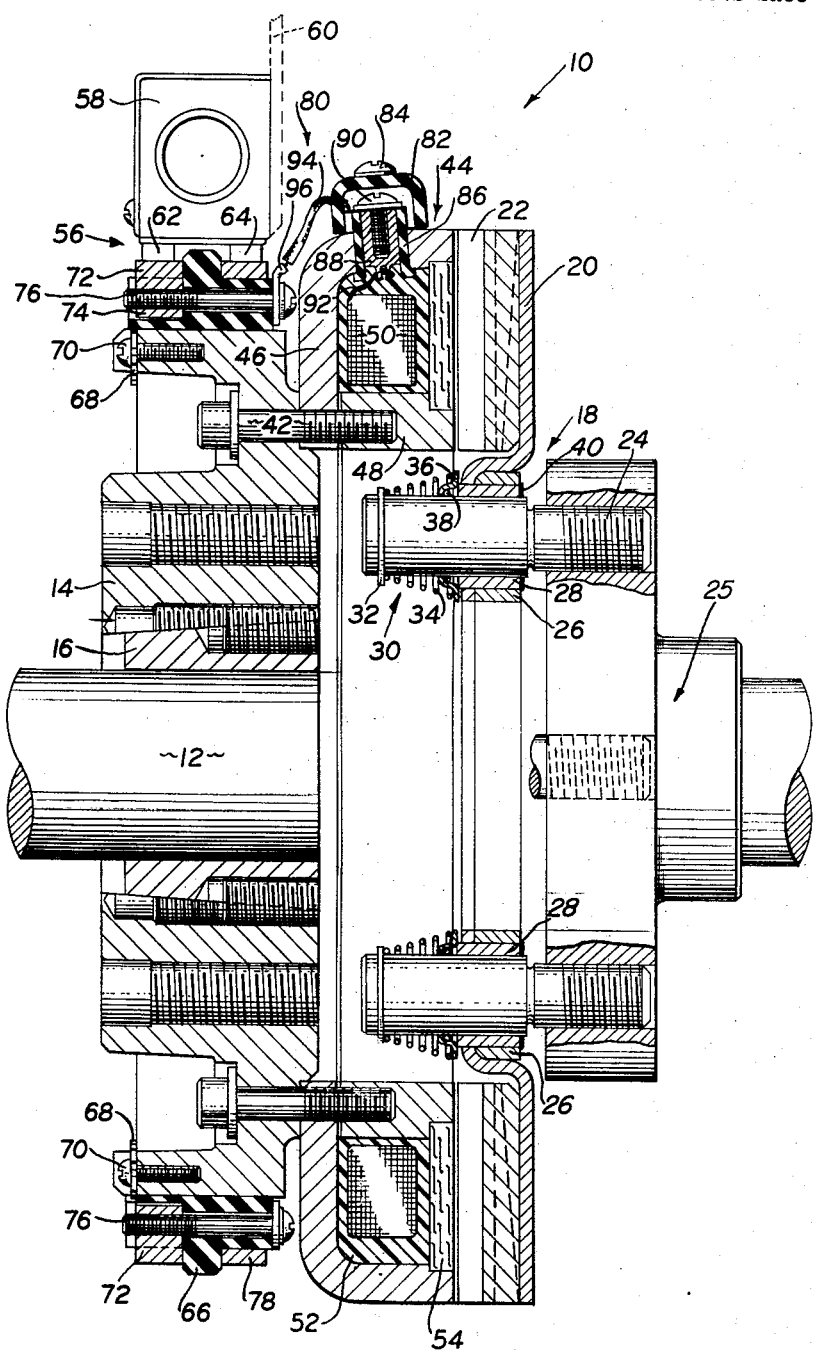
Figure 1 illustrates a clutch mechanism utilizing the invention disclosed herein.

Briefly, this invention relates to an electromagnetic clutch or brake which is provided with a coil and coil housing and a friction lining disposed normal to the axis of rotation and spanning the coil housing. The coil housing has located adjacent thereto a clutch plate assembly which is adapted to be relatively rotatable with respect to said coil housing and is comprised of a clutch plate and a plurality of circumferentially spaced segmental pads mounted on said clutch plate with a major portion of each pad being axially spaced from the clutch plate so that air is allowed to flow relatively unrestricted between the pads and the clutch plate. The clutch plate is supported by a plurality of drive pins which are connected to a suitable hub or sleeve and has a configuration such that the center of gravity of the unsupported portion of the assembly disposed radially outward of the drive pins lies substantially in the same plane with the mounting contact portion between the drive pins and the clutch plate so that no moment is produced by centrifugal force which tends to cone the radially outward unsupported portion of the clutch plate assembly. The pads which are attached to the shoe plate have a V-shaped central portion and disc portions disposed in a plane normal to the axis of rotation and formed integral with the V portion of the pads. This arrangement allows for a resilient engagement of the clutch plate assembly with the friction lining carried by the coil housing and also provides a very large cooling surface for the pads to minimize heat distortion and burning of the friction material which would otherwise be caused by heat generation during slip between the relatively rotatable members.

Referring to the drawing for a more detailed description of the mechanism, the clutch assembly 10 is comprised of a driving shaft 12 having a hub 14 and a taper lock bushing 16 cooperable with hub 14 to fix the hub to the shaft 12. A driven clutch member 18 is comprised of a clutch shoe plate 20 or annular mounting plate having a plurality of segment or friction pads 22 suitably attached thereto.

A plurality of drive pins 24 arranged in a circular arrangement provide an attaching means to a driven plate or hub assembly 25 to transmit torque from the driving shaft to the driven shaft when the clutch is engaged. An annular hub ring 26 is fixed to clutch plate 20 and is provided with a plurality of holes adapted to receive sleeves 28 which are press-fitted into the hub plate. The clutch plate is free to move axially relative to the drive pins by means of a subassembly 30 disposed on each drive pin comprising a retainer ring 32, release spring 34, retaining washer 36, detent spring 38, and followup spring 40. With this arrangement, when the clutch is energized, clutch plate 20, hub 26, and sleeves 28 are slidable on the drive pins to effect relative axial movement between the engageable clutch members.

The hub 14 has attached thereto, by bolts or cap screws 42, a clutch coil subassembly 44 which is comprised of pole pieces 46 and 48. A coil 50 is disposed within the annular opening defined by the aforementioned pole pieces and is held in place by a suitable plastic material 52 filling the space between the coil and the pole pieces. A friction disc 54 is receivable in notched-out portions of the pole pieces 46 and 48 and is disposed substantially co-planar with the ends of the pole pieces 46 and 48.

A current-carrying subassembly 56 is comprised of a brush holder assembly 58 fixed to a suitable frame portion 60 and having brushes 62 and 64 mounted thereon. A slip ring insulator 66 is fixed for rotation with hub 14 by locking discs 68 receivable in notched-out portions of the inside wall of the slip ring insulator. The locking discs 68 are attached to the hub 14 by means of a plurality of screws 70. A slip ring 72 is mounted on slip ring insulator 66 and is provided with an arcuate locking portion 74 receivable in an arcuate cut-out portion in the slip ring insulator and a plurality of screws 76 are adapted to hold slip ring 72 in fixed relationship with the slip ring insulator. Another slip ring 78 is attached to the slip ring insulator 66 in the same manner as described for slip ring 72 (but not shown in Figure 1).

A coil-connecting assembly 80 is comprised of an insulator cap 82 attached to pole piece 46 by a screw and lock washer means 84. A coil connecting insulator 86 is disposed in a suitable opening in pole piece 46 and has contained therein a brass insert 88 fixed in place by a screw and lock washer means 90. Lead wire 92 is connected to coil 50 and to brass insert 88 to provide a current-carrying means and a lead wire 94 is connected at one end to brass insert 88 and has insulator cap 96 provided on the other end which is attached to one of the screws 76. With this arrangement, current is fed from brush 62 to slip ring 72 through screw 76 to insulator cap 90, lead wire 94, brass insert 88, and lead wire 92 into coil 50. A similar wiring arrangement is furnished for slip ring 78 (not shown in the drawing).

In operation, when current is fed to slip rings 72 and 78, coil 50 is energized by the aforementioned means which sets up a torroidal flux path in pole pieces 46, 48, and segment pads 22, resulting in relative axial movement of clutch plate 20 and drive pins 24 to provide frictional engagement between the ends of pole pieces 46, 48, outer surfaces of friction disc 54, and the friction faces of segment pads 20. When coil 50 is deenergized, release spring 34 moves clutch plate 20 to a disengaged position.

Figures 2, 3:
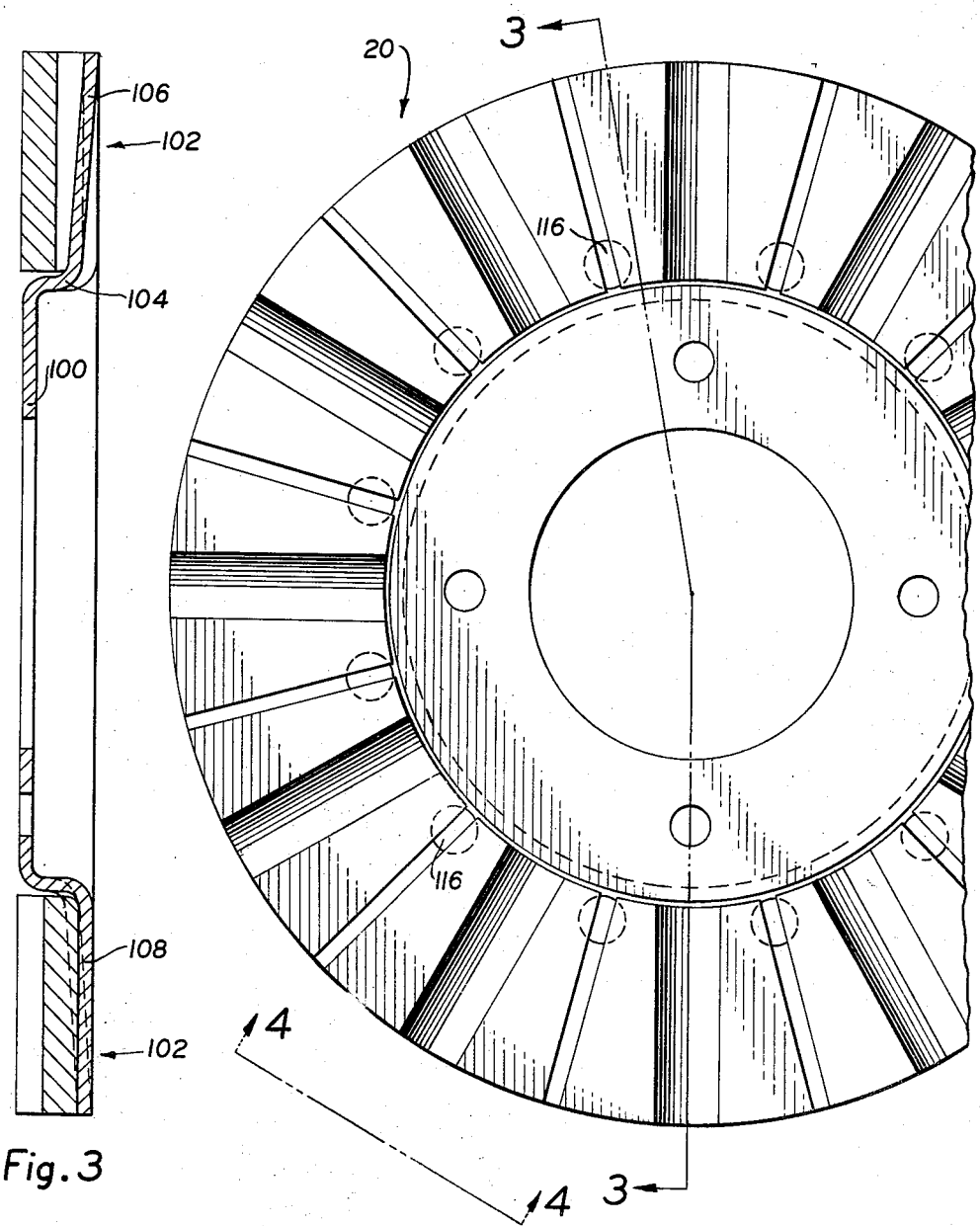
Figure 2 is a plan view of the clutch plate with the segment pads attached thereto.
Figure 3 is a section taken on 3—3 of Figure 2.
Figure 4:
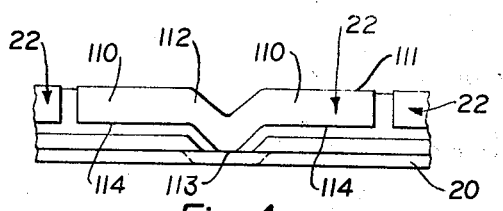
Figure 4 is a section taken on 4—4 of Figure 2.
Figures 5, 6:
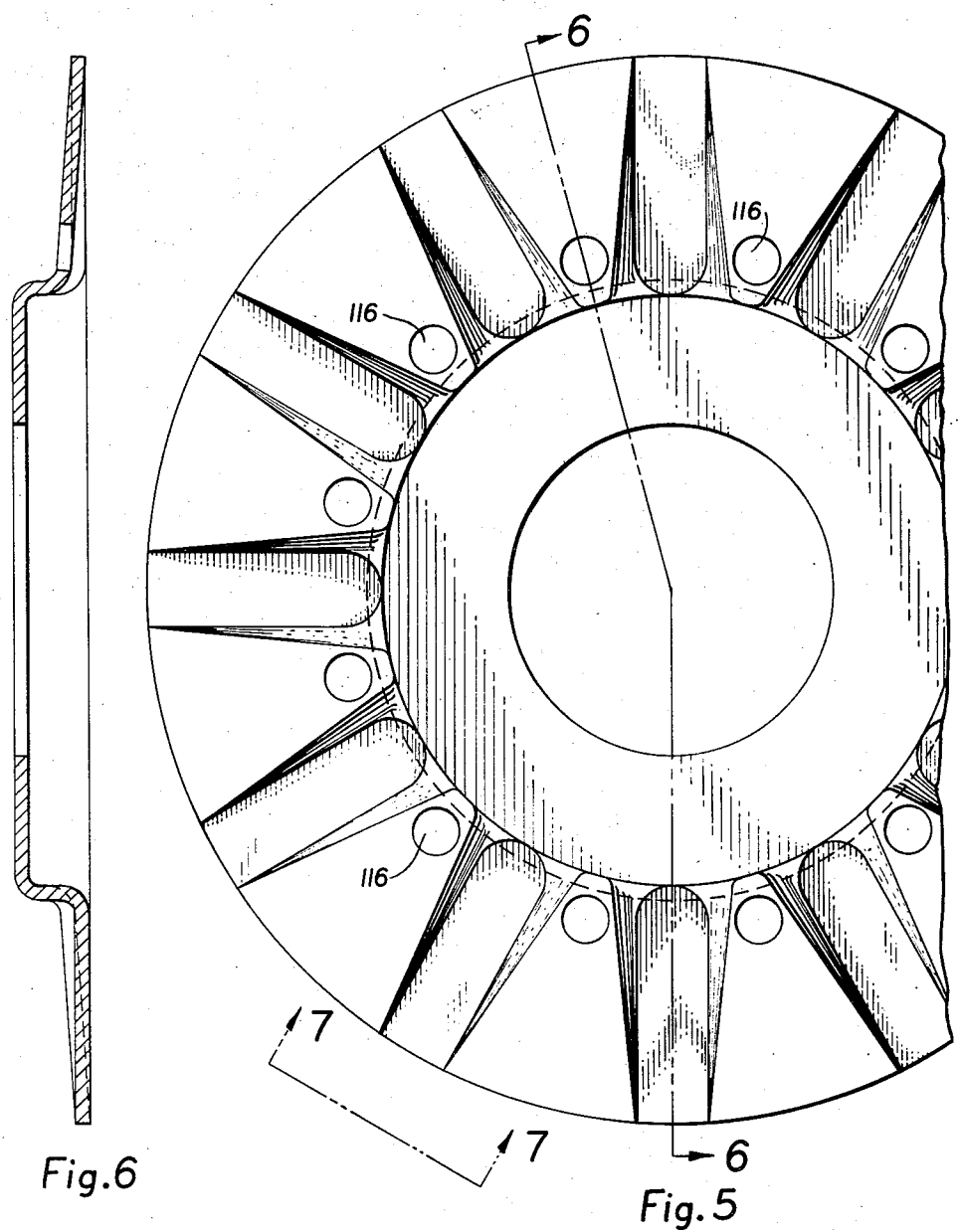
Figure 5 is a plan view of the clutch plate shown in Figure 2.
Figure 6 is a section taken on 6—6 of Figure 5.
Figure 7:
Figure 7 is a section taken on 7—7 of Figure 5.

Figures 2, 3, and 4 of the drawing illustrate the details of the clutch plate and segment pads 22 attached thereto, and Figures 5, 6, and 7 illustrate the details of the clutch plate per se. Clutch plate 20 is comprised of a planar disc portion 100 and axially offset portion 102 connected to disc portion 100 by an intermediate portion 104. In order to provide strength and rigidity, axially offset portion 102 is provided with circumferentially alternating portions or segments 106 and 108. One set of segments 106 lie in a plane which forms an acute angle with the plane of the planar disc portion 100, and the other set of segments 108 lie in a plane parallel to the plane of disc portion 100.

Segment or friction pads 22 are comprised of flat main body portions or cantilever portions 110 and a central V shaped or offset portion 112 which is adapted to be attached by a weld or other suitable means to the clutch plate along projection 113. With this arrangement, the segment pads have a central portion or depression which is spaced from the driving disc when front faces 111 of the clutch segment pads are engaged and spaces between adjacent segment pads which allow circulation of air between the elements. It is obvious also, that heat which is generated in the segment pads can be dissipated by the exposed surface 114 on the back side or face of the segment pads, which is spaced from the clutch plate 20 and a radial air passage is provided between the segment pads and the mounting plate. In addition, vent holes 116 are provided in clutch plate 20 for the circulation of cooling air between the clutch plate and the segment pads.

Figures 8, 9:
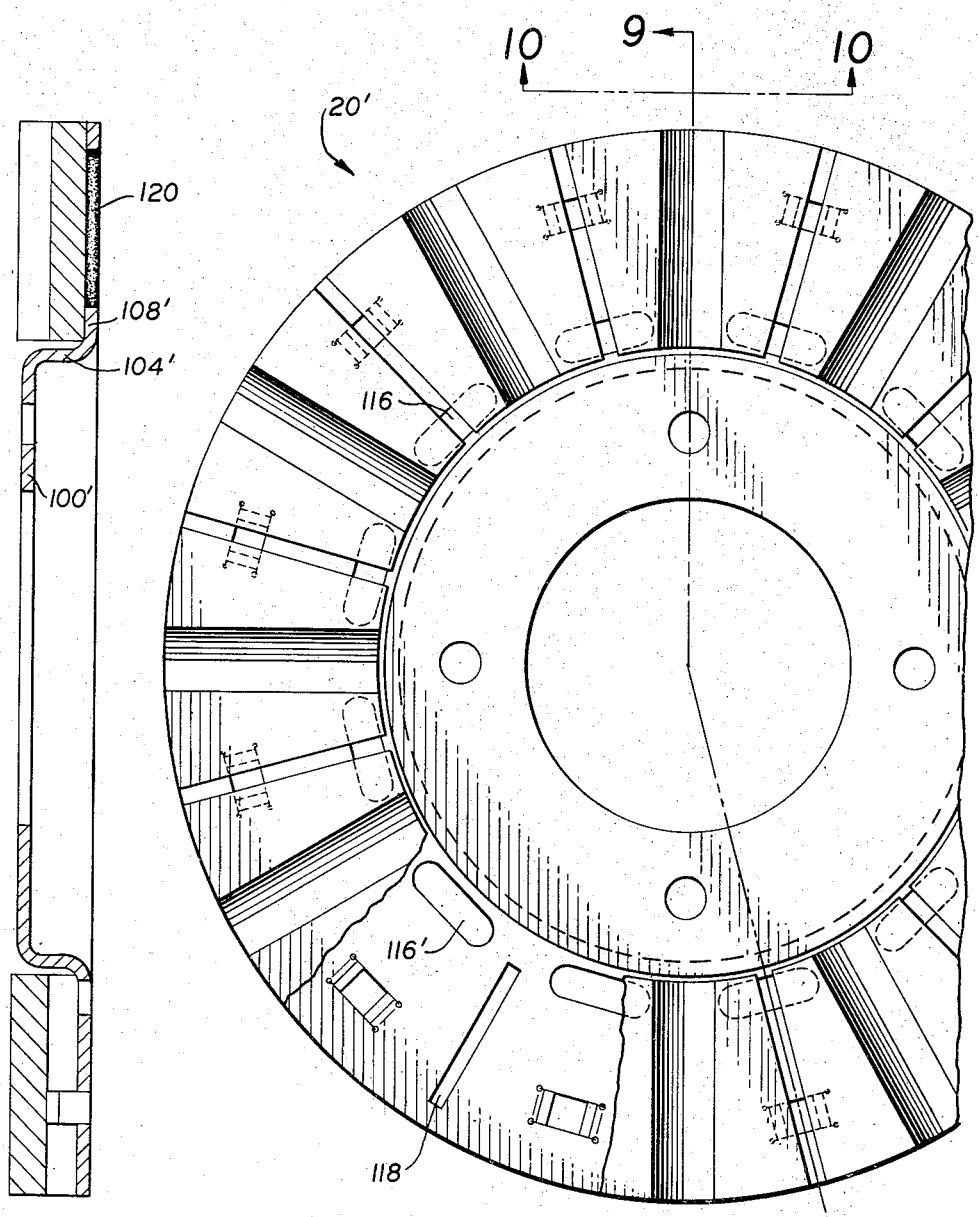
Figure 8 is a plan view of a modification of the clutch plate shown in Figure 2.
Figure 9 is a section taken on 9—9 of Figure 8.
Figure 10:
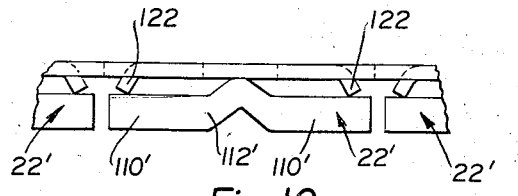
Figure 10 is a section taken on 10—10 of Figure 8.

Figures 8, 9, and 10 illustrate a modified clutch plate 20' wherein a planar disk portion 100' is attached to an axially offset portion 108' by an intermediate portion 104'. Radially directed slots 118 in clutch plate 20' are disposed in abutting relation to a V-shaped portion 112' of segment pads 22'. Segment pads 22' are attached to clutch plate 20 by a weld 120 in slots 118. The vent holes in this modification are shaped in the form of slots 116' instead of circular holes to allow for greater movement of air.

In order to eliminate any objectionable vibratory hum set up in segment pads 22', a plurality of upturned tabs 122 are provided in clutch plate 20'. These tabs are arranged to damp the vibration of portions 110' of segment pads 22'. It is obvious that these vibration damping pads could also be applied to the species shown in Figures 2 to 7, is so desired.

An important part of all of the species of this invention is that the center of mass of the segment pads in an axial plane lies in substantially the same plane as the planar disc portion 100 or 100', to eliminate any coming effect caused by centrifugal force which results when the clutch plate is connected to its hub or shaft in axially spaced relation to the segment pads.

It is obvious from the foregoing disclosure that a clutch structure has been disclosed which provides a maximum cooling for a maximum clutch-engaging surface, and in which a coning effect caused by centrifugal force is eliminated due to the co-planar disposition of the planar disc portion of the clutch plate and the axial center of mass of the segment pads. Also, means has been provided to eliminate any objectionable vibratory hum which is characteristic of this type structure, especially during engagement of the clutch.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. A friction clutch member comprising inner and outer radially directed annular portions, an intermediate annular portion connecting said inner and outer portions, a plurality of annularly disposed friction pads attached to said outer annular portion, each of said pads having a back face axially adjacent said outer annular portion, a front face axially remote from said outer annular portion, main body portions of said pads spaced from said outer annular portion of said member, and a central portion of each of said pads axially spaced from said back face and attached to said outer annular portion of said member.

2. A friction clutch member comprising an annular inner portion, an annular outer portion axially offset from said inner portion, an intermediate portion connecting said inner portion and said outer portion, a plurality of friction pads each comprising main body portions lying in a plane normal to the axis of rotation of said clutch member and each having a back face adjacent said outer portion, and a further portion of each of said pads being axially offset from said back face and being connected to said annular outer portion.

3. A friction clutch member comprising inner and outer radially directed annular portions, an intermediate portion connecting said inner and outer portions, a plurality of friction pads attached to said outer annular portion, each of said pads having a central portion attached to said outer annular portion and cantilever type main body portions integral with said central portion and lying circumferentially on each side of said central portion, said main body portions each having a back face spaced from said outer portion and said central portion attached to said outer annular portion being axially offset from said back face.

4. A friction clutch member comprising inner and outer radially directed annular portions, an annular intermediate portion connecting said inner and outer annular portions, a plurality of openings provided in said outer annular portion, a plurality of friction pads having a central portion attached to said outer annular portion and cantilever type main body portions lying circumferentially on each side of said central portion and being axially spaced from said outer annular portion so that said central portion forms a projection with respect to said main body portions whereby air is free to circulate through said openings in said annular portion and between said outer annular portion and said friction pads.

5. In a clutch mechanism having a first rotatable member, a second rotatable member, an energizing coil, a pole housing partially enclosing said energizing coil and being fixed for rotation with said first rotatable member, the improvement comprising a clutch plate having an annular inner portion, an annular outer portion axially offset from said inner portion, an intermediate portion integrally connecting said inner portion and said outer portion, a plurality of annularly disposed friction pads attached to said annular outer portion, each of said pads having main body portions spaced from said outer annular portion and a portion of each of said pads attached to said outer annular portion of said clutch plate and forming a projection with respect to said main body portions.

6. A friction clutch member comprising a mounting plate having an annular inner portion, an annular outer portion axially offset from said inner portion having a first set of circumferentially spaced segments substantially parallel to said inner portion, a second set of circumferentially spaced segments integral with said first set of segments and disposed at an acute angle therewith, an intermediate portion integral with said inner and outer portions, a plurality of circumferentially disposed friction pads each having a radially disposed central portion connected to each of said second set of segments and main body portions each having a back face axially spaced from said central portion and being connected thereto whereby said pads are engageable with a cooperating friction disc and cooling air is free to flow adjacent each of said back faces.

7. A device according to claim 6 wherein cooling openings are provided in said outer annular portion of said mounting plate.

8. A friction clutch member comprising a mounting plate having an annular inner portion, an annular outer portion axially offset from said inner portion having a first set of circumferentially spaced segments substantially parallel to said inner portion, a second set of circumferentially spaced segments integral with said first set of segments and disposed at an acute angle therewith, an intermediate portion integral with said inner and outer portions, a plurality of circumferentially spaced friction pads, each pad having a central portion forming a projection on the back side of the pad and being connected to a segment of said second set of segments and cantilever mounted main body portions integral with and axially spaced from said central portion whereby said main body portions fully engage a cooperating annular element disposed substantially parallel to the friction pads.

9. A friction clutch member comprising an annular mounting plate, an annular friction means having a back face axially spaced from said mounting plate, a front face on said friction means axially spaced from said back face, circumferentially spaced portions integral with said friction means, said circumferentially spaced portions being attached to said mounting plate and disposed in axially spaced relation to said back face whereby air passage space is provided between said mounting plate and said back face and circumferentially spaced radially disposed depressions formed in said front face of said friction means whereby air passage space is provided in said front face.

10. A friction clutch plate member comprising circumferentially spaced segment portions, friction plate mounting means connected to said segment portions, said segment portions each having a front face and a back face, a circumferentially intermediate offset portion forming a radially disposed depression in said front face and a radially disposed projection in said back face whereby said segment portions are strengthened and resist distortion.

11. A friction clutch member comprising an annular mounting plate, a plurality of circumferentially arranged segment portions each having a front face and a back face, a circumferentially intermediate portion forming a radially disposed projection on the back face of said segment portion, and said projection being connected to said mounting plate whereby air passages are provided between said segment portions and said mounting plate.

12. A friction clutch member comprising an annular mounting plate, an annular friction means having a front face and a back face, circumferentially spaced offset portions forming radially disposed depressions in said front face and radially disposed projections in said back face, and said projections being connected to said mounting plate whereby said annular friction means is strengthened and resists distortion and air passages are provided between said friction means and said mounting plate.

References Cited in the file of this patent
UNITED STATES PATENTS

| | | |
|---|---|---|
| 2,554,874 | Oetzel | May 29, 1951 |
| 2,684,744 | Myers | July 27, 1954 |

FOREIGN PATENTS

| | | |
|---|---|---|
| 327,366 | France | Dec. 16, 1902 |
| 656,167 | Great Britain | Aug. 15, 1951 |